(No Model.) 4 Sheets—Sheet 1.
F. G. & A. C. SARGENT.
MACHINE FOR PREPARING AND BURRING WOOL.
No. 422,635. Patented Mar. 4, 1890.
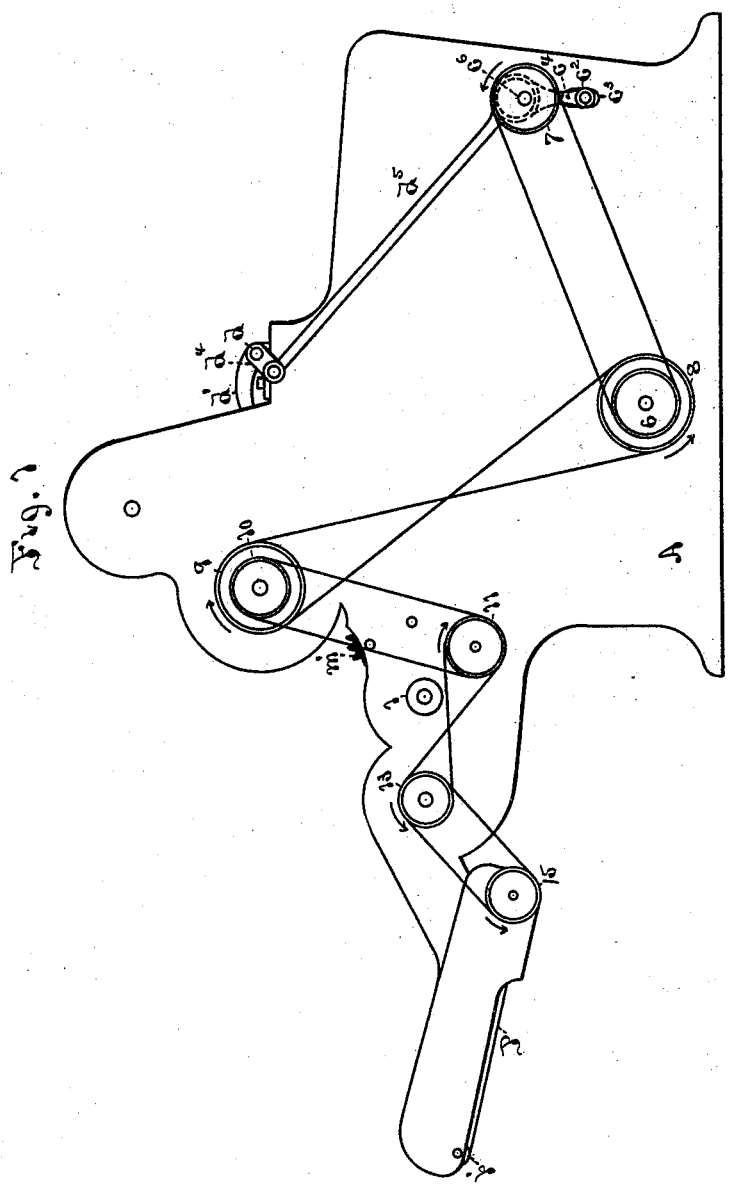
Witnesses
Wm. B. Brown
N. P. Ockington
Inventors
Frederick G. Sargent
Allan C. Sargent
by David Hall Rice
Atty (No Model.) 4 Sheets—Sheet 2.
F. G. & A. C. SARGENT.
MACHINE FOR PREPARING AND BURRING WOOL.
No. 422,635. Patented Mar. 4, 1890.
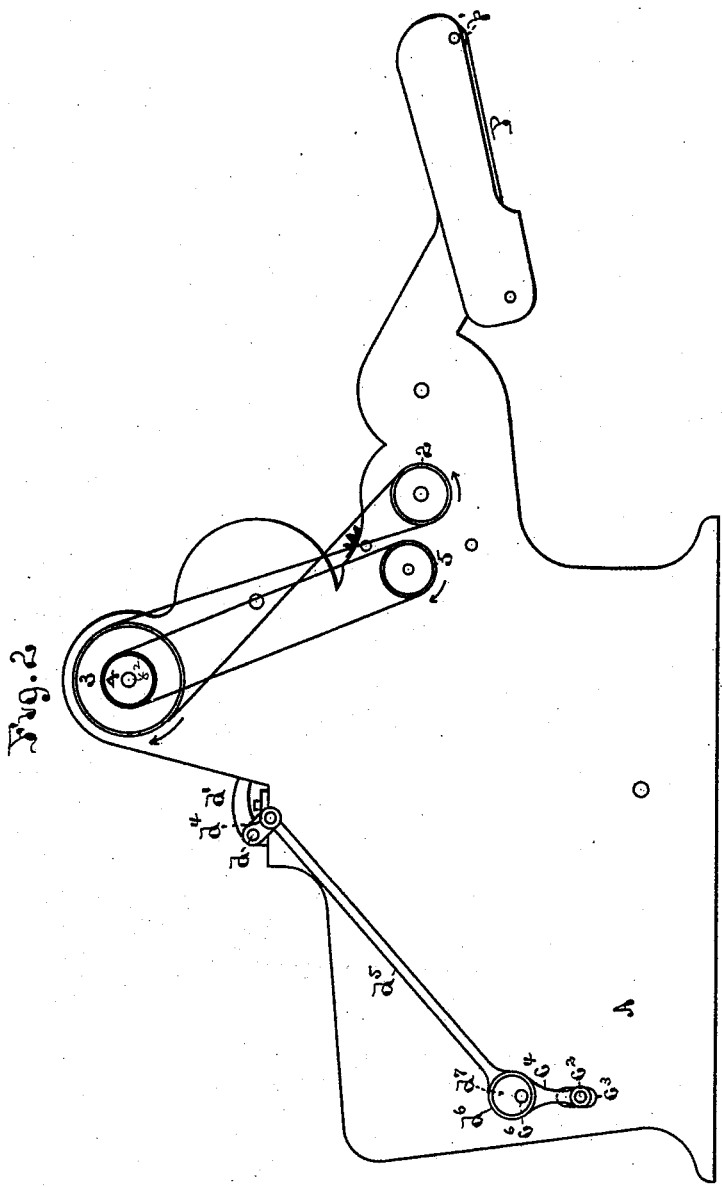

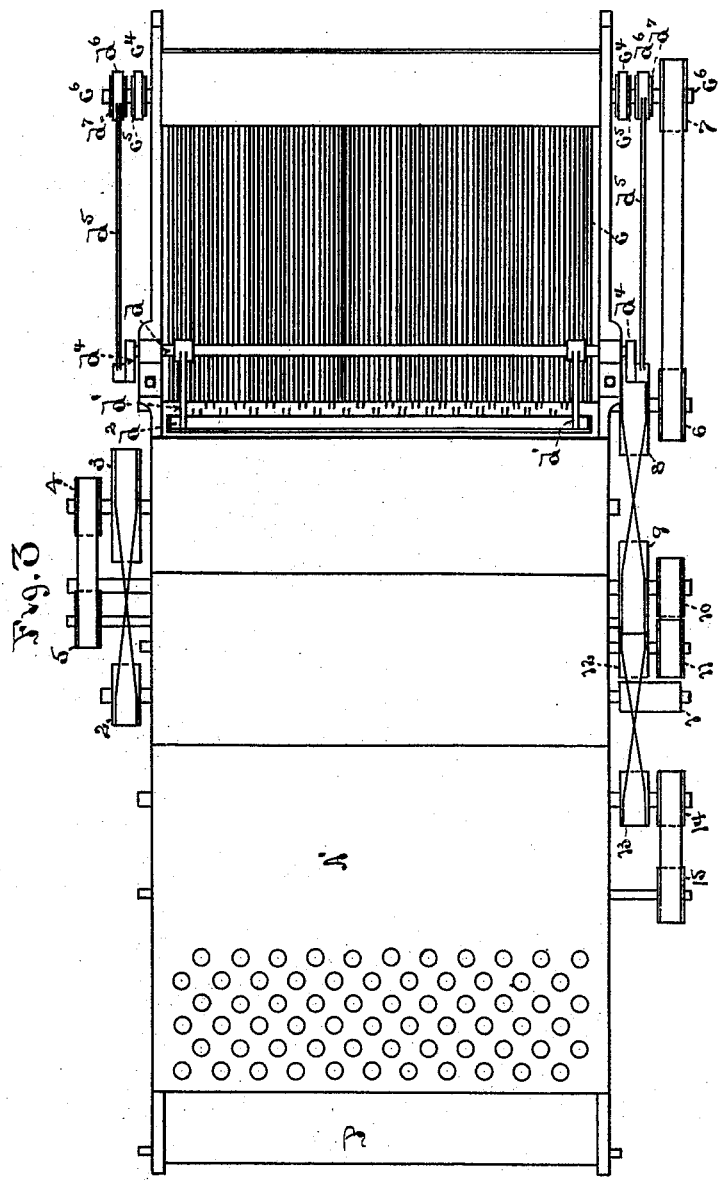

(No Model.) 4 Sheets—Sheet 4.
F. G. & A. C. SARGENT.
MACHINE FOR PREPARING AND BURRING WOOL.
No. 422,635. Patented Mar. 4, 1890.
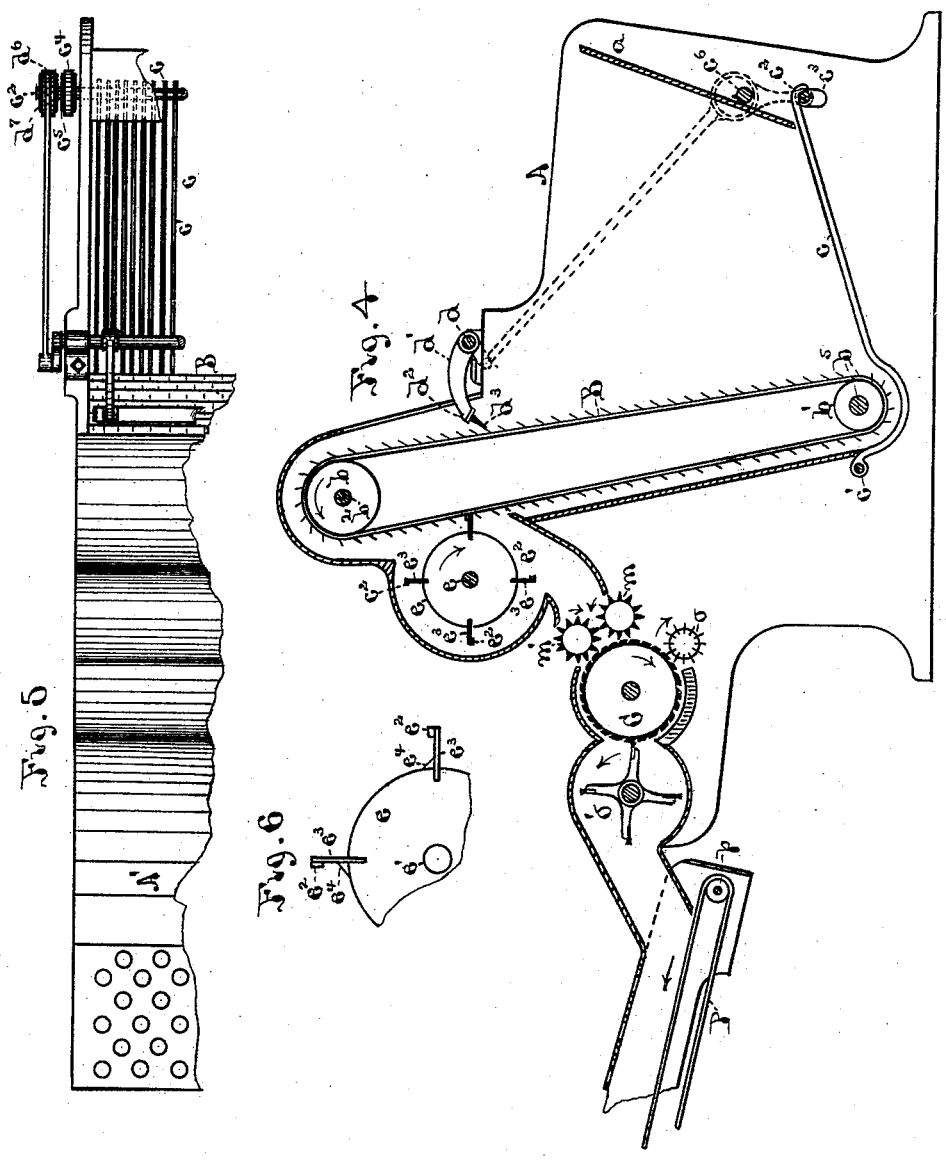

UNITED STATES PATENT OFFICE.

FREDERICK G. SARGENT AND ALLAN C. SARGENT, OF GRANITEVILLE, MASSACHUSETTS.

MACHINE FOR PREPARING AND BURRING WOOL.

SPECIFICATION forming part of Letters Patent No. 422,635, dated March 4, 1890.

Application filed November 15, 1889. Serial No. 330,375. (No model.)

*To all whom it may concern:*

Be it known that we, FREDERICK G. SARGENT and ALLAN C. SARGENT, of Graniteville, in the county of Middlesex and State of Massachusetts, have invented a new and useful Improvement in Machines for Preparing and Burring Wool, of which the following is a specification.

Our improvement relates to machines for preparing and burring wool; and it consists in certain new and improved constructions and combinations of the same in connection with self-feeding devices, substantially as hereinafter described and claimed.

In the drawings, Figure 1 is a side elevation of a machine constructed according to our invention. Fig. 2 is a side elevation of the opposite side of the machine from Fig. 1. Fig. 3 is a top plan view of the same. Fig. 4 is a longitudinal central vertical section through the same. Fig. 5 represents a portion of Fig. 3 with the working parts and casing shaded to indicate them more minutely, and with certain parts in a modified arrangement and having the driving-belts, pulleys, and shafts omitted. Fig. 6 is an enlarged detail view of a portion of the doffer-cylinder used to remove the wool from the feeding-belt and through it into the feed-rollers of the burring-cylinder.

A is the frame of the machine, consisting of two side plates with necessary strengthening cross-girts and a top or cover part A', which secures them in position to sustain the working parts. A nearly-vertical partition $a$ forms one end of the box or hopper into which the wool is to be thrown, the frame-plates A A constituting the sides of this box. The other end of the space for containing the wool is formed of the broad belt B, which completely fills the breadth of the box, and is armed with spines or wire teeth in such position that they incline upward in the box and downward on the opposite side of the belt. This belt is endless and passes around two rollers $b$ $b'$, which are mounted on shafts $b^2$ $b^3$, revolving in bearings in the frame-plates A. The bottom of the box is formed by a series of parallel bars $c$ $c$, which are shown in Fig. 3 as placed close side by side, forming a continuous bottom, and in Fig. 5 as arranged more openly with spaces between, hung pivotally at one end upon the shaft $c'$, which is supported at its ends in the frame-plates A. These bars $c$ $c$ curve around underneath the roller $b'$ and the belt passing around it, and thence continue in a straight line underneath the partition $a$ and rest upon a rod or shaft $c^2$, which passes horizontally through slots $c^3$ in the frame-plates A, and is attached to the arms and straps $c^4$ $c^4$ of two eccentrics $c^5$ $c^5$, which are themselves mounted upon the shaft $c^6$, revolving in bearings in the frame-plates A.

When the shaft $c^6$, with its eccentrics $c^5$, is revolved in the eccentric-straps and their arms $c^4$, the latter do not revolve, but are alternately raised and lowered, carrying with them the rod $c^2$ in the slots $c^3$ of the frame-plates. The rising and falling of this rod carries with it the ends of the bars $c$, which lie over it and are slightly bent to retain their place upon it. This gives the bars $c$ a rising-and-falling motion, oscillating on the rod $c'$, which causes the wool which has been thrown into the box and lies upon them to alternately approach and recede from the spines or teeth on the belt B, causing these spines to take up a certain amount of wool from the mass and draw it away therefrom at every successive motion of the mass of wool toward and away from the belt, thus producing an evenness of the taking up of the wool by the belt which would not be possible if the wool were merely thrown into the box and the belt allowed to run past the mass of it without giving it motion toward and away from the belt.

In order that the surplus or excess of wool, if any, which is taken up by the belt may not be carried off by the latter, we provide a shaft $d$, mounted in bearings in the frame-plates A and extending across the box parallel to the belt B. On this shaft we attach the arms $d'$, which carry on their outer ends the bars $d^2$, extending parallel with the belt B and armed with teeth $d^3$ in such relation that as the shaft $d$ is turned the teeth will be carried up and down past the spines of the belt B and scrape or knock off any excess of wool which may be taken up by the spines of the belt. On their upward motion the teeth $d^3$ are in turn cleaned by the spines of the belt and the particles of wool taken up by them dropped back into the box. The shaft $d$ is reciprocally revolved by means of cranks $d^4$ $d^4$, attached to its projecting ends, to the crank-pins of which rods $d^5$ $d^5$ are attached. To the other ends of these rods are connected eccentric-straps $d^6$, which surround eccentrics $d^7$ on the shaft $c^2$, so that as the shaft is revolved the eccentrics will impart a reciprocal motion to the rods $d^5$ and through the shaft $d$ to the teeth $d^3$.

The wool, being taken up by the belt B, as described, is carried around over the roller $b$ and down on the opposite side until it meets the doffer $e$, mounted upon the shaft $e'$, which revolves on bearings in the frame-plates A. A view of part of this doffer detached from the machine is shown in Fig. 6. This doffer consists of bars $e^2$, of wood or other similar material, extending across the breadth of and parallel to the belt B and held upon the doffer $e$ by flexible sheets of leather or other similar material $e^3$, to which the bars are attached. As the doffer $e$ is revolved the bars come in contact with the wool upon the spines of belt B and draw it off of the spines and throw it downward into the feed-rolls $m$ $m'$ of the burring-cylinder. The flexibility of the leather sheets holding the bars $e^2$ allows the latter to give sufficiently, so as not to injure the spines upon the belt B as they pass by the latter. In order to assist in sustaining the sheets of leather $e^3$, which hold the bars in position, small blocks $e^4$ are attached to the surface of the doffer $e$, so that as the leather sheets stand upright their rear faces will rest loosely against the faces of these blocks. This arrangement gives the necessary stiffness to the outer edges of the sheets of leather $e^3$, so as to enable them to clean the spines of the belt B effectively, while avoiding any injury to the latter, as above stated. From the feed-rolls $m$ $m'$ the wool passes forward and is delivered to the burring-cylinder C, which is provided with a knock-off cylinder $o$ and a doffer-cylinder $o'$, the latter having arms provided with brushes to clean the wool from the burring-cylinder and throw it forward onto the apron P, whence it is carried out of the machine and delivered burred or partially prepared for use. The apron P passes over rollers $p$ $p'$ in the usual manner.

By providing the doffer $e$, in combination with the feeding-belt B on the delivery side of the same, and arranging it with relation to the belt B, the feed-rolls $m$ $m'$, and burring-cylinder C so that the wool shall be thrown directly from the descending face of the belt into the feed-rolls of the burring-cylinder, we provide a means of combining the self-feeding belt B with the burring-machine, and thus avoid the necessity of handling and bunching up the wool to a greater or less degree in transferring it to the burring-machine, which felts it together around the burrs, &c., and injures the fiber for subsequent operations. It is a well-understood fact that a self-feeding belt like B, running vertically past a mass of wool, will take it up more evenly than it can be spread over the apron of a burring-machine by hand, and by transferring the fiber directly to the burring-cylinder with the same evenness of delivery and without massing or bunching it in any way the action of the burring-cylinder becomes more even, and it requires fewer operations subsequent to belt B to prepare the wool and it produces evener and better thread.

The system of belts and pulleys for driving the different parts of the mechanism is as follows: A pulley 1 is attached to one end of the shaft of the burring-cylinder, which extends through the frame-plates A. This pulley is belted to any suitable counter-shaft. On the other extended end of the burring-cylinder shaft is attached another pulley 2, from which, by a cross-belt, is belted the pulley 3 on the shaft $b^2$ of the upper roll $b$ of belt B. Another pulley 4 on this shaft is belted to the pulley 5 on the shaft of the lower feed-roll $m$. A pulley 6 on the shaft $b^3$ of the lower belt-roll $b'$ is belted to the pulley 7 on the eccentric-shaft $c^6$. Another pulley 8 on the shaft $b^3$ is belted by a cross-belt to the pulley 9 on the shaft $e'$ of the doffer $e$. From another pulley 10 on this latter shaft is belted the pulley 11 on the shaft of the knock-off cylinder $o$. Another pulley 12 on the latter shaft is belted by a cross-belt to the pulley 13 on the shaft of the doffer $o'$, while from the pulley 14 on the latter shaft is belted the pulley 15 on the shaft of the apron-roller $p$. The sizes of these various pulleys may be varied as desired to give the working parts a relatively faster or slower speed.

The bars $c$ (shown in Fig. 3) might be all connected together or in one piece across the entire bottom of the receptacle for the wool, forming a solid bottom, if preferred, as they are only made separate for convenience of removal. When arranged with spaces between them, as shown in Fig. 5, they allow any dirt and impurities to drop through and save cleaning out of the receptacle so often, and the up-and-down motion of the bars assists in this sifting of the dirt through them.

What we claim as new and of our invention is—

1. The combination of the receptacle for receiving the wool, the feeding-belt B, armed with teeth and arranged to run upward in a vertical direction past one side of the body of wool in said receptacle over rollers $b'$ $b$ and take it in a continuous sheet therefrom, the tilting bottom of said receptacle, arranged to alternately tilt or cant the mass of wool resting thereon toward and away from the face of said belt, means for operating the same, and the doffer $e$, arranged on the opposite and downward-running side of said belt in proximity thereto and to remove the sheet of wool therefrom as it passes the same, substantially as described.

2. The combination of the receptacle for receiving the wool, the feeding-belt B, armed with teeth and arranged to run upward in a vertical direction past one side of the body of wool in said receptacle and take it in a continuous sheet therefrom, the tilting bottom of said receptacle, arranged to alternately tilt or cant the mass of wool resting thereon toward and away from the face of said belt, means for operating the same, the doffer $d^2$, arranged above the said receptacle to remove the excess of wool from said belt, and the doffer $e$, arranged in proximity to the opposite and downward-running side of said belt to remove the wool from the same as it passes by it, substantially as described.

3. The combination of the receptacle for receiving the wool, the feeding-belt B, armed with teeth and arranged to run upward in a vertical direction past one side of the body of wool in said receptacle over rollers $b'$ $b$ and take it in a continuous sheet therefrom, the tilting bottom of said receptacle, formed of separate slats and arranged to alternately tilt or cant the mass of wool resting thereon toward and away from the face of said belt, means for operating the same, and the doffer $e$, arranged on the opposite and downward-running side of said belt in proximity thereto and to remove the sheet of wool therefrom as it passes the same, substantially as described.

FREDERICK G. SARGENT.
   ALLAN C. SARGENT.

Witnesses:
  ARTHUR B. PLIMPTON,
  HERBERT V. HILDRETH.